United States Patent
Chang et al.

(10) Patent No.: US 6,743,541 B2
(45) Date of Patent: Jun. 1, 2004

(54) MONOPOLAR CELL PACK OF PROTON EXCHANGE MEMBRANE FUEL CELL AND DIRECT METHANOL FUEL CELL

(75) Inventors: Hyuk Chang, Seongnam (KR); Chan Lim, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 83 days.

(21) Appl. No.: 09/805,580

(22) Filed: Mar. 14, 2001

(65) Prior Publication Data

US 2002/0076597 A1 Jun. 20, 2002

(30) Foreign Application Priority Data

Mar. 17, 2000 (KR) ......................................... 2000-13605

(51) Int. Cl.[7] ................................................ H01M 8/10
(52) U.S. Cl. ............................. 429/30; 429/34; 429/35; 429/38
(58) Field of Search .............................. 429/30, 34, 35, 429/38

(56) References Cited

U.S. PATENT DOCUMENTS

| | | | |
|---|---|---|---|
| 5,688,610 A | * 11/1997 | Spaeh et al. | .................. 429/30 |
| 5,925,477 A | 7/1999 | Ledjeff et al. | |
| 5,998,057 A | 12/1999 | Koschany et al. | |
| 6,037,073 A | * 3/2000 | Besmann et al. | .............. 429/34 |
| 6,110,612 A | * 8/2000 | Walsh | .......................... 429/13 |

OTHER PUBLICATIONS

Karl Kordesch, "Fuel Cells and Their Applications," VCH Publishers, Inc.*

Kordesch et al., "Fuel Cells and Their Application," VCH Publishers, Inc., pp. 72–76 (1997).*

* cited by examiner

Primary Examiner—Patrick Ryan
Assistant Examiner—Dah-Wei Yuan
(74) Attorney, Agent, or Firm—Burns, Doane, Swecker & Mathis, L.L.P.

(57) ABSTRACT

A proton exchange membrane fuel cell and a direct methanol fuel cell pack using a monopolar electrode are provided. The fuel cell pack includes a plurality of cells each having a membrane in its middle and a cathode and an anode at both sides of the membrane, collector plates contacting the cathode and the anode, respectively, in each cell, and an electrical connection member for electrically connecting adjacent cells. The cells are evenly disposed on an arbitrary plane with a hollow interposed between two adjacent cells. The electrical connection member is positioned in the hollow. The fuel cell pack also includes a porous fuel diffusion member contacting the anode of each cell; a porous air contact member contacting the cathode of each cell; an anode end plate and a cathode end plate disposed at the side of the anodes of the cells and at the side of the cathodes of the cells, respectively, for protecting the cells; a fuel supply and discharge unit for supplying fuel toward the anodes in the hollow and discharging the fuel; a fuel flow stopper disposed at a portion at the part of the cathodes in the hollow, for preventing fuel flowing at a portion at the part of the anodes in the hollow from flowing toward the portion at the part of the cathodes in the hollow; and a sealing member for sealing the anodes of the cells and the portion of the hollow corresponding to the anodes. Accordingly, circulation of fuel for the plurality of cells is performed through a single inlet and a single outlet so that a fuel supply line is very simple compared to a structure of a fuel supply line for each cell in a conventional cell pack having a structural limitation. In addition, the cell pack generates current of a high density without a separate cooling device.

20 Claims, 8 Drawing Sheets

MONOPOLAR CELL PACK OF PROTON EXCHANGE MEMBRANE FUEL CELL AND DIRECT METHANOL FUEL CELL

BACKGROUND OF THE INVENTION

1. Field of the Invention

The present invention relates to a cell pack of a proton exchange membrane fuel cell and a direct methanol fuel cell.

2. Description of the Related Art

A proton exchange membrane fuel cell (PEMFC), which is a future clean energy source which can substitute for fossil energy sources, has a high power density and a high energy conversion efficiency. In addition, a PEMFC can operate at a room temperature and can be miniaturized and hermetically sealed so that it can be applied to low emission automobiles, generating systems for home use, mobile communication equipment, medical instruments, military equipment, equipment for the space industry and so on. That is, a PEMFC can be applied to a variety of fields.

A PEMFC is a generating system which generates direct current electricity from the electrochemical reaction between hydrogen and oxygen. For the PEMFC, a single cell includes an anode, a cathode and a proton exchange membrane interposed between the anode and the cathode. The proton exchange membrane of the PEMFC has a thickness of 50–200 $\mu$m and is formed of a solid polymeric electrolyte. Each of the anode and the cathode of the PEMFC is composed of a gas diffusion electrode (hereinafter, an anode or a cathode is referred to as a gas diffusion electrode) which includes a support layer for supplying fuel gas and a catalyst layer on which oxidation and reduction of the fuel gas and oxidant gas (hereinafter, fuel gas, oxidant gas and liquid fuel is referred to as fuel) proceed.

When a reactant gas is supplied to such a PEMFC, oxidation proceeds on the anode of a gas diffusion electrode so that hydrogen molecules are converted into hydrogen ions and electrons. The hydrogen ions are transferred to a cathode via a proton exchange membrane, and reduction proceeds on the cathode. In other words, oxygen molecules receive electrons so that they are converted into oxygen ions. The oxygen ions react with hydrogen ions from the anode so that they are converted into water molecules.

In the gas diffusion electrode of a PEMFC, the catalyst layer is disposed between the support layer and the proton exchange membrane. The support layer is formed of carbon cloth or carbon paper and is surface-processed so that a reactant gas, water transferred to the proton exchange membrane and water generated from reaction can easily pass through the support layer.

A direct methanol fuel cell (DMFC) has the same structure as a PEMFC. However, instead of using hydrogen gas as a reactant gas, liquid methanol is supplied to an anode, and oxidation proceeds due to action of a catalyst, generating hydrogen ions, electrons and carbon dioxide. Such a DMFC is less efficient than a PEMFC, but it can be easily applied to portable electronic equipment because fuel is injected in a liquid state.

For the above two kinds of fuel cell, a single cell generates less than 1 V, practically. Accordingly, to generate a high voltage, a plurality of single cells are superposed and electrically connected in series. To collect electricity generated, fuel flow fields and bipolar plates as collector plates as many as superposed cells are used. A fuel flow area may be realized as a metal mesh, but it is usually inscribed on a graphite block as a collector plate which is conductive, can be hermetically sealed and has a predetermined or greater thickness.

However, when such a fuel flow area is used, a flow path of a complex structure is required to consecutively supply fuel and oxygen throughout a stack of single cells starting from the outermost single cell to the innermost single cell without making the fuel and oxygen mixed. Such a fuel flow path of a complex structure has a high probability that liquid or gas which is supplied to the stack is leaked. In addition, since a plurality of collector plates should be superposed, it is difficult to hermetically seal a stack and to reduce the size and weight of the stack so that the power density is degraded. The outermost portion of the stack and the middle portion thereof have different internal resistance, temperature and humidity so that a high load can partially occur in a single cell. Consequently, the duration of the stack can be shortened.

When high power is required, it is advantageous to use such a stack method even if the method has drawbacks described above. However, when a stack is used for obtaining low power, e.g., of the applications of electronic equipment, a monopolar cell pack structure making up for the above drawbacks is advantageous.

U.S. Pat. No. 5,925,477 discloses an assembly of single cells which has a structure as shown in FIG. 1. Referring to FIG. 1, a plurality of single cells in which anodes 4, 5 and 6 and cathodes 7, 8 and 9 are superposed on the top and bottom of the membranes 3, respectively, are arranged in line. The cathodes 7 and 8 of single cells are electrically connected in series to the respective anodes 5 and 6 of adjacent single cells by conductors 2 through the overlapping of the electrode area of one single cell with the opposite electrode area of the next cell. In such a structure, a fuel flow field is provided by a graphite plate (not shown) on which a flow path is formed.

The graphite plate should be designed so that a fuel path can be provided from the outside of a cell to accomplish the fuel flow between electrodes. Moreover, in the structure in which the membrane and the upper and lower electrodes of a single cell on which electrochemical reaction proceeds should be bent, catalytic reaction is concentrated on bent portions, shortening the duration of an electrode.

SUMMARY OF THE INVENTION

To solve the above problems, it is a first object of the present invention to provide a fuel cell having a fuel flow field therewithin so that it is not necessary to separately design a fuel flow path.

It is a second object of the present invention to provide a fuel cell pack which has a simple structure and can be easily manufactured.

It is a third object of the present invention to provide a fuel cell pack having an improved power density and an improved degree of freedom in designing a single cell.

Accordingly, to achieve the above objects of the invention, in a first embodiment, there is provided a fuel cell pack including a plurality of cells each having a membrane in its middle and a cathode and an anode at both sides of the membrane, collector plates contacting the cathode and the anode, respectively, in each cell, and an electrical connection member for electrically connecting adjacent cells. Here, at least two cells are provided. The cells are evenly disposed on an arbitrary plane with a hollow interposed between two adjacent cells, and the electrical connection member is positioned in the hollow. The fuel cell pack includes a porous fuel diffusion member contacting the anode of each cell; a porous air contact member contacting the cathode of each cell; an anode end plate and a cathode end plate disposed at the side of the anodes of the cells and at the side of the cathodes of the cells, respectively, for protecting the cells; fuel supply and discharge means for supplying fuel toward the anodes in the hollow and discharging the fuel; a fuel flow stopper disposed at a portion at the part of the cathodes in the hollow, the fuel flow stopper preventing fuel flowing at a portion at the part of the anodes in the hollow from flowing toward the portion at the part of the cathodes in the hollow; and a sealing member for sealing the anodes of the cells and the portion of the hollow corresponding to the anodes.

In a second embodiment, there is provided a fuel cell pack including a plurality of cells each having a membrane in its middle and a cathode and an anode at both sides of the membrane, collector plates contacting the cathode and the anode, respectively, in each cell, and an electrical connection member for electrically connecting adjacent cells. Here, at least two cells are provided. The cells are disposed on both sides of an intermediate layer, which is provided with fuel supply and discharge means, with a hollow of predetermined volume interposed between two adjacent cells in the level direction of the intermediate layer. The electrical connection member is disposed in the hollow. The anodes of the cells disposed on both sides of the intermediate layer contact the intermediate layer. The fuel cell pack includes a porous fuel diffusion member contacting the anode of each cell; a porous air contact member contacting the cathode of each cell; first and second end plates disposed at the respective sides of the cathodes of the cells, for protecting the cells; a fuel flow stopper disposed at a portion corresponding to the cathodes of adjacent cells in a hollow, the fuel flow stopper preventing fuel flowing at a portion at the part of the anodes in the hollow from flowing toward the portion at the part of the cathodes in the hollow; and a sealing member for sealing the anodes of the cells and the portion of a hollow corresponding to the anodes.

In the first embodiment, two cells may be provided, and a fuel inlet and a fuel outlet corresponding to the hollow may be disposed on the anode end plate with a predetermined interval. Alternatively, at least two cells may be provided, and a fuel inlet corresponding to one hollow and a fuel outlet corresponding to the other hollow may be disposed in the anode end plate.

In the second embodiment, a storage space for storing fuel supplied to the anodes of the cells may be provided in the intermediate layer. Three cells may be disposed on each of both sides of the intermediate layer, and a fuel inlet and a fuel outlet which correspond to hollows, respectively, between the cells may be disposed in the intermediate layer at a predetermined interval.

In the first and second embodiments, the porous fuel diffusion member is formed of a carbon-plastic composite. Particularly, the porous fuel diffusion member may include carbon or graphite impregnated therein. The porous air contact member is formed of a carbon-plastic composite and may have a plurality of channels for the flow of air on its bottom. Preferably, the electrical connection member has a shape of a mesh.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PRESENT INVENTION

Hereinafter, embodiments of a fuel cell pack according to the present invention will be described in detail with reference to the attached drawings.

<<First Embodiment>>

Figure 1:
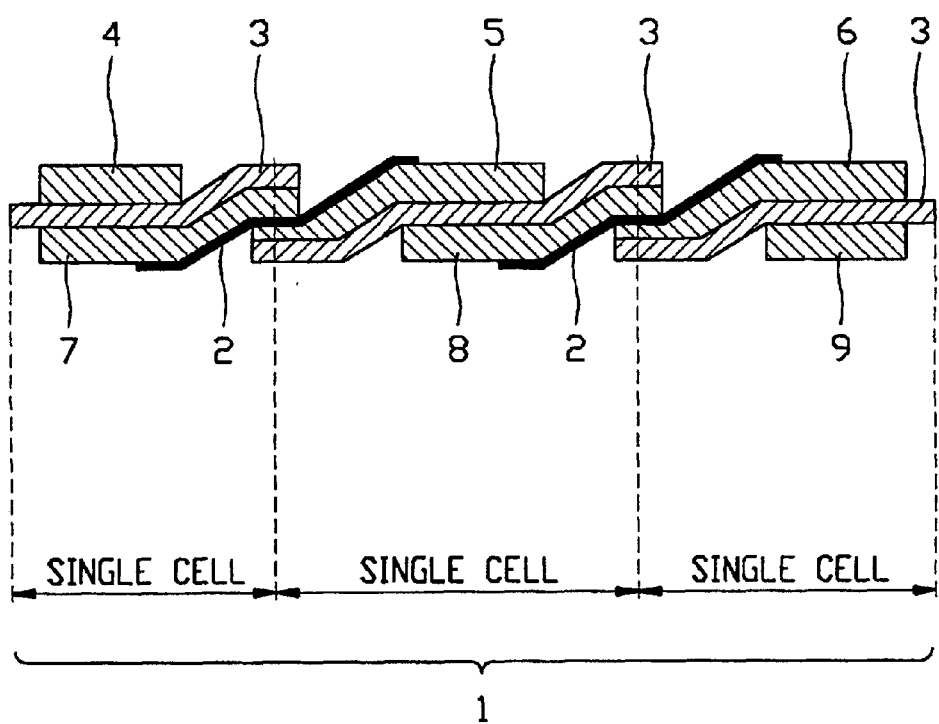
FIG. 1 is a schematic sectional view illustrating a monopolar cell pack of prior art.
Figure 2:
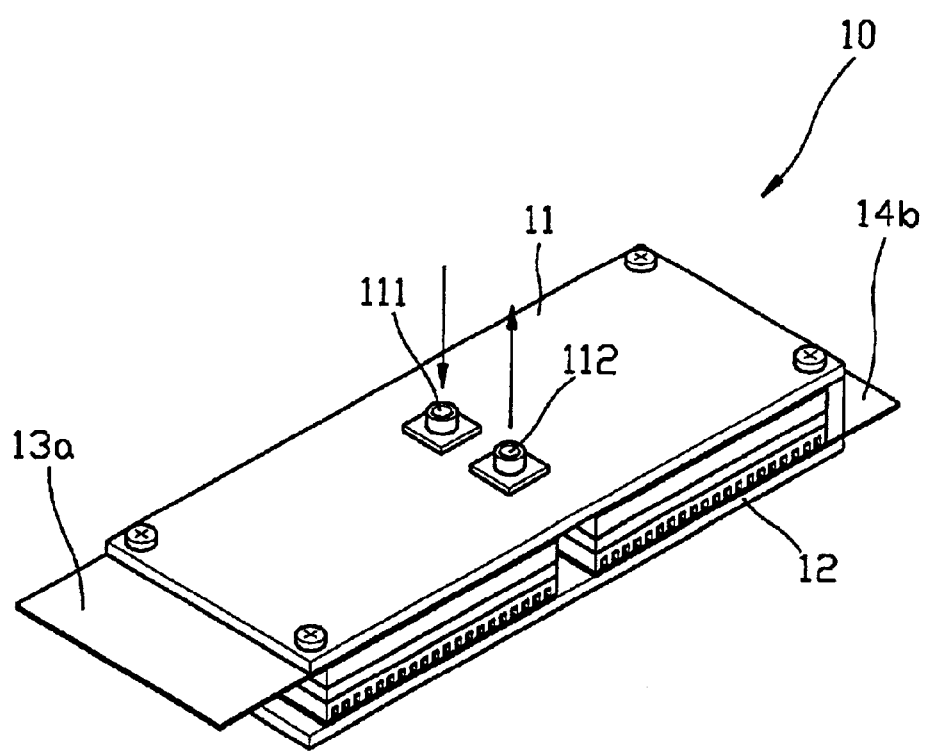
FIG. 2 is a schematic perspective view illustrating a first embodiment of a cell pack according to the present invention.

FIG. 2 is a schematic perspective view illustrating the appearance of a fuel cell pack 10 according to the present invention. Referring to FIG. 2, an anode end plate 11 is coupled to a cathode end plate with a predetermined gap therebetween. A thin anode collector plate 13a and a thin cathode collector plate 14b extend to predetermined distances, respectively, at both sides of the cell pack in a lengthwise direction. A fuel inlet 111 and a fuel outlet 112 are provided in the middle of the top surface of the anode end plate 11. The fuel inlet 111 is connected to a hydrogen or methanol storage container or ampule provided outside the cell pack 10, allowing continuous inflow of fuel, so that the cell pack 10 can be used as a power supply for portable instruments. The anode collector plate 13a and the cathode collector plate 14b are provided in different cells within the cell pack 10 and extended out of the cell pack 10 to supply power to the outside. Each of the portions extending out of the cell pack 10 can be formed of a different material. In other words, each collector plate is provided only within a cell pack, and a portion electrically exposed to the outside of the cell pack is formed of a different conductive material than the collector plate and electrically connected to the corresponding collector plate.

Figure 3:
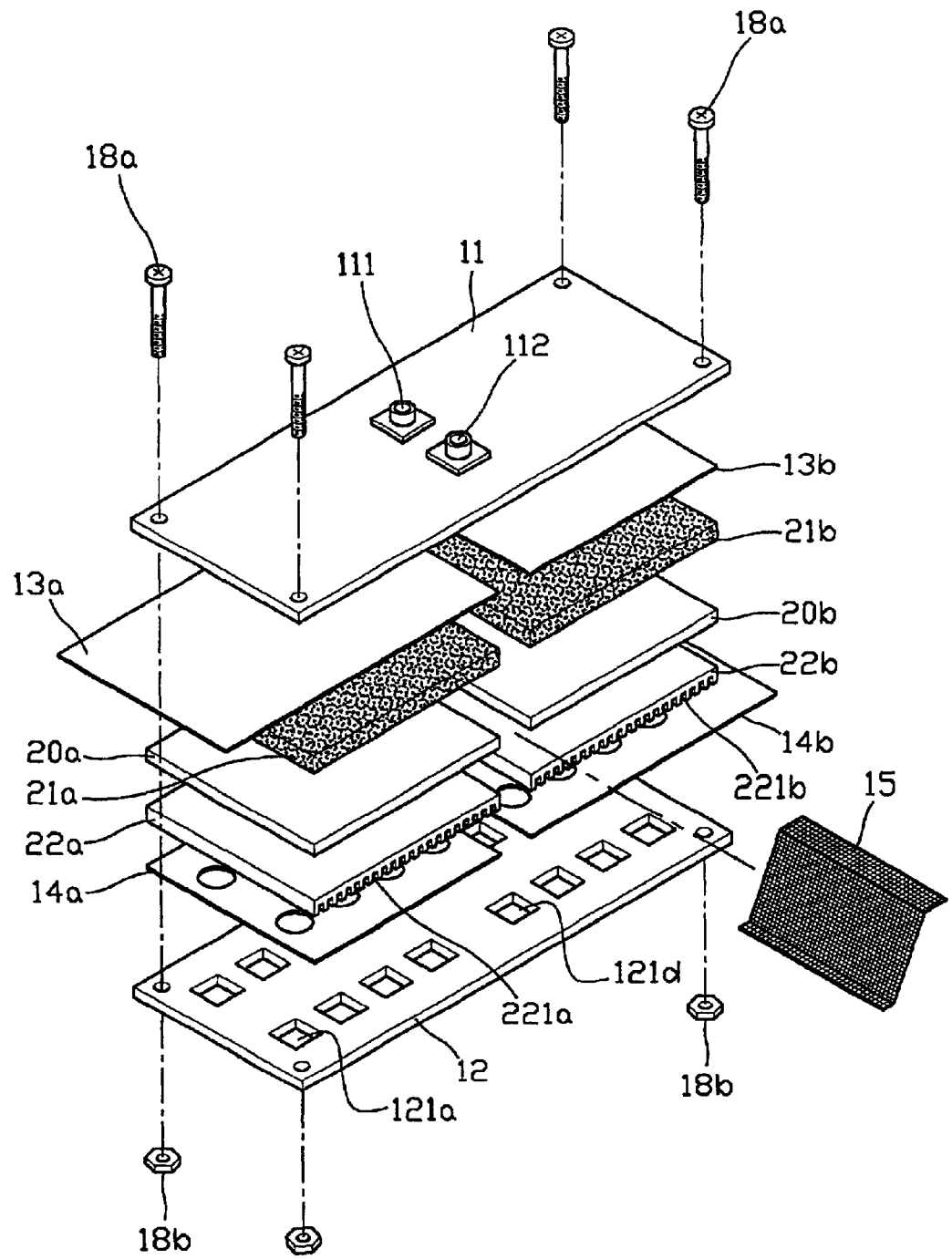
FIG. 3 is an exploded view illustrating the cell pack of FIG. 2.
Figure 4:
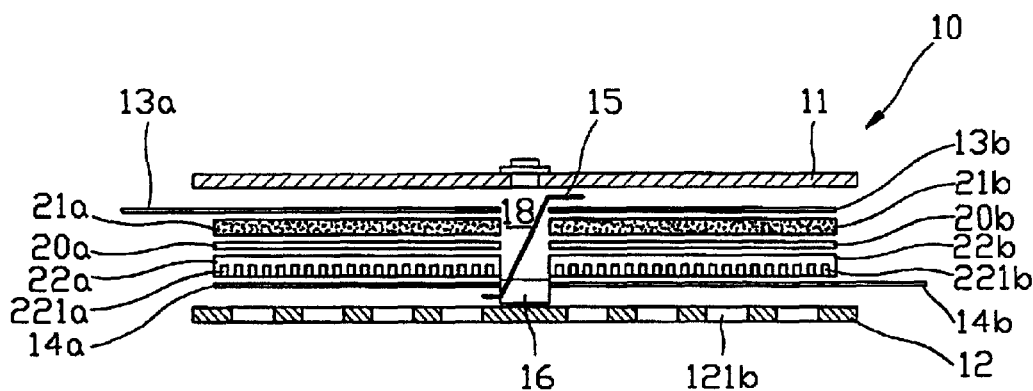
FIG. 4 is a lengthwise sectional exploded view illustrating the stack structure of the cell pack of FIG. 2.
Figure 5:
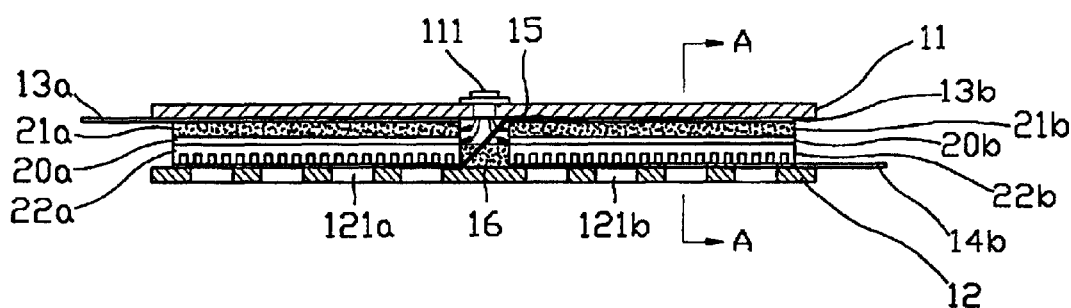
FIG. 5 is a sectional view illustrating the stack structure of the cell pack of FIG. 2.
Figure 6:
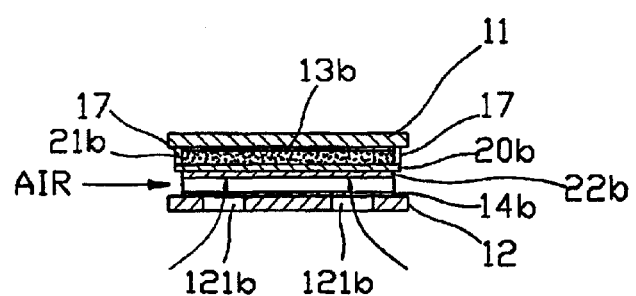
FIG. 6 is a sectional view taken along the line A—A of FIG. 5.
Figure 7:
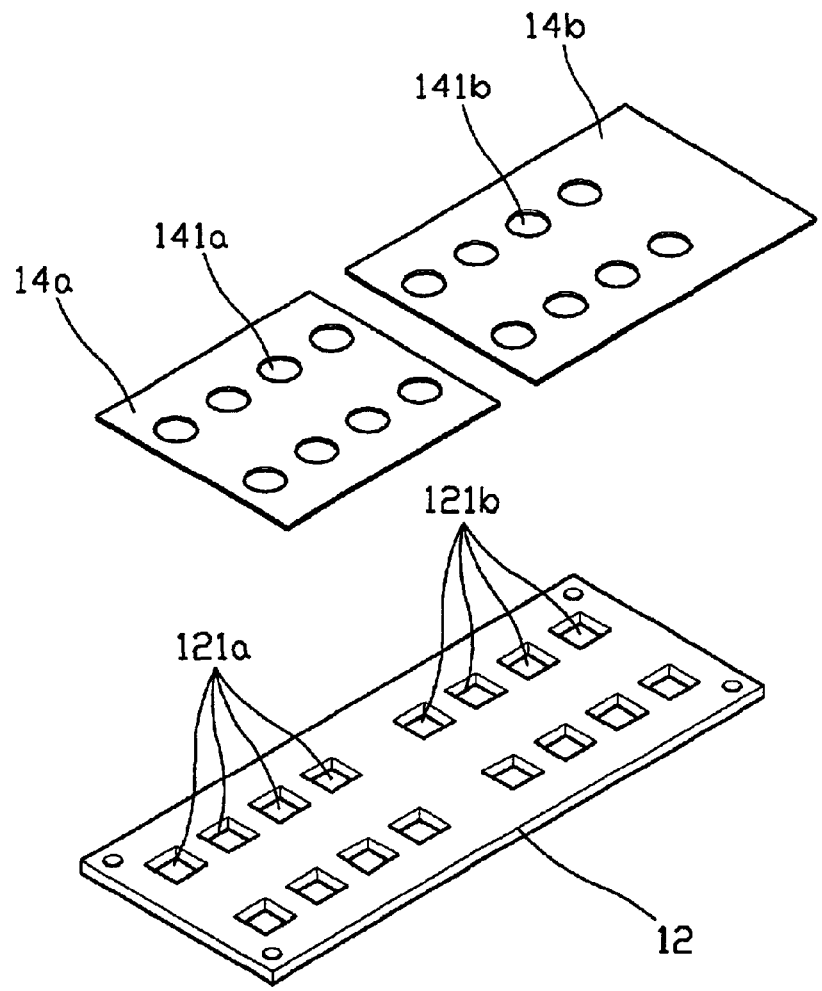
FIG. 7 is a schematic perspective view illustrating a cathode collector plate and a cathode end plate which are applied to a cell pack according to the present invention.

FIG. 3 is a schematic exploded perspective view of the cell pack 10 of FIG. 2. FIG. 4 is a sectional view in which stack members are spaced at predetermined intervals to illustrate the internal stack structure of the cell pack 10. FIG. 5 is a partial sectional view of the cell pack 10 in which the members between the anode end plate 11 and the cathode end plate 12 are closely stuck to each other by the anode and cathode end plates 11 and 12. FIG. 6 is a sectional view taken along the line A—A of FIG. 5.

Figure 8:
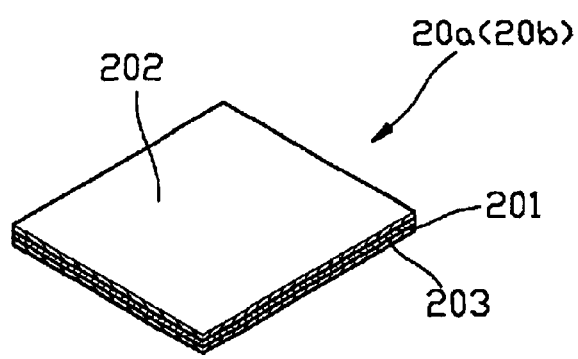
FIG. 8 is a schematic perspective view illustrating the single-layer structure of an ion exchange membrane and electrodes assembly (a catalyzed membrane) applied to a cell pack according to the present invention.

Referring to FIGS. 3 through 6, two cells are disposed with a predetermined gap between the anode end plate 11 and the cathode end plate 12 which substantially constitute the appearance of a cell pack. Each cell includes a proton exchange membrane, that is, a catalyzed membrane, 20a or 20b having catalyst layers on both top and bottom surfaces thereof, a fuel diffusion member 21a or 21b disposed on the catalyzed membrane 20a or 20b and an air contact member 22a or 22b beneath the catalyzed membrane 20a or 20b. The proton exchange membrane 20a or 20b is structured such that catalyst layers 202 and 203 are stacked on both top and bottom surfaces of a membrane 201, as shown in FIG. 8.

The fuel diffusion member 21a or 21b and one catalyst layer of a membrane, which contacts the fuel diffusion member 21a or 21b, constitute an anode. The air contact member 22a or 22b and the other catalyst layer of the membrane, which contacts the air contact member 22a or 22b, constitute a cathode.

A channel 221a or 221b for the flow of air is formed in the air contact member 22a or 22b. The air contact member 22a or 22b has the channel 221a or 221b to form a flow path of the air or is formed of a macro- or micro-porous carbon-plastic composite material allowing the flow of the air.

An anode collector plate 13a or 13b and a cathode collector plate 14a or 14b, which act as monopolar electrodes at the respective anode and cathode, are provided in the upper and lower portions, respectively, of each cell. The anode collector plate 13a of one cell and the cathode collector plate 14b of the other cell are extended out of the cell pack 10.

As shown in FIG. 5, a hollow 18 is provided between two cells. An electrical connection member 15 for electrically connecting the cathode collector plate 14a of one cell to the anode collector plate 13b of the other cell is disposed within the hollow 18. The electrical connection member 15 is preferably configured in the form of a mesh passing the fuel to have a sufficient width so that its area contacting the collector plates 14a and 13b can be large and to prevent the electrical connection member 15 from obstructing the flow of fuel within the hollow 18. In addition, the electrical connection member 15 is preferably formed of nickel, considering corrosion-resistance against fuel. When the electrical connection member 15 is not a mesh, its width should be narrowed so that it does not obstruct the flow of fuel if possible.

A fuel flow stopper 16 is provided at the lower portion of the hollow 18. The fuel flow stopper 16 stops up the hollow 18 up to the bottom of the proton exchange membranes 20a and 20b to prevent the fuel from flowing into the hollow 18 and prevent the fuel from flowing toward the cathode and being mixed with the air.

As shown in FIG. 6, sealing members 17 are formed at both sides of the fuel diffusion member 21a or 21b to prevent the diffusing fuel from flowing out. The sealing members 17 prevent the fuel, which is supplied into the upper portion of the hollow 18 and diffused to the fuel diffusion member 21a or 21b, from flowing out of the cell pack 10.

A preferred configuration for extending the area on which the air contact members 22a and 22b contact the air in such a structure described above is shown in FIGS. 4 through 7. The cathode collector plates 14a and 14b in the two cells have through holes 141a and 141b, and the cathode end plate 12 has through holes 121a and 121b. The through holes 141a and 141b correspond to the through holes 121a and 121b one to one.

In such a structure, each of the collector plates 13a, 13b, 14a and 14b acts as a monopolar electrode. The anodes are shielded from the outside by the sealing members 17. Fuel such as hydrogen or methanol is supplied into the hollow 18 provided between the anodes and then diffused through the fuel diffusion members 21a and 21b of the respective anodes. Particularly, the air of the cathodes flows through the air contact members 22a and 22b having the channels 221a and 221b, respectively, so that the size of a cell can be reduced, and a power density can be increased.

In the above embodiment, the electrical connection member 15 disposed within the hollow 18 is realized as a mesh such that the electrical connection member 15 does not obstruct the flow of the fuel supplied into the hollow 18 and electrically connects the cathode collector plate 14a of one cell to the anode collector plate 13b of the other cell, which act as monopolar electrodes in the respective two cells. Each of the anode end plate 11 and the cathode end plate 12 is formed of a material such as a bakelite which has an enough stiffness to closely fasten the members between the two plates 11 and 12 when the members and the two plates 11 and 12 are coupled by coupling parts such as screws 18a and bolts 18b and thermal resistance within a predetermined temperature range. Particularly, since the contact pressure between an anode, a cathode and a proton exchange membrane, which are closely fastened by the anode end plate 11 and the cathode end plate 12, in each cell is very closely related to the internal resistance of the cell, the anode and cathode end plates 11 and 12 is formed to have a sufficient stiffness considering the contact pressure.

The fuel flow stopper 16 and the sealing members 17 are formed of selant having silicon rubber as a main component. Particularly, the hollow 18 between the anodes is not filled with selant so that the flow path of a hydrogen or methanol solution can be secured.

<<Second Embodiment>>

Figure 9:
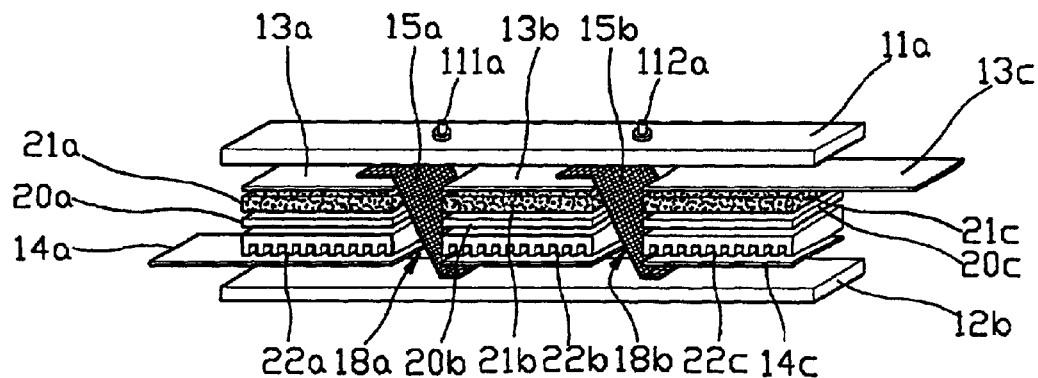
FIG. 9 is a three-dimensional exploded view illustrating the stack structure of a second embodiment of a cell pack according to the present invention.
Figure 10:
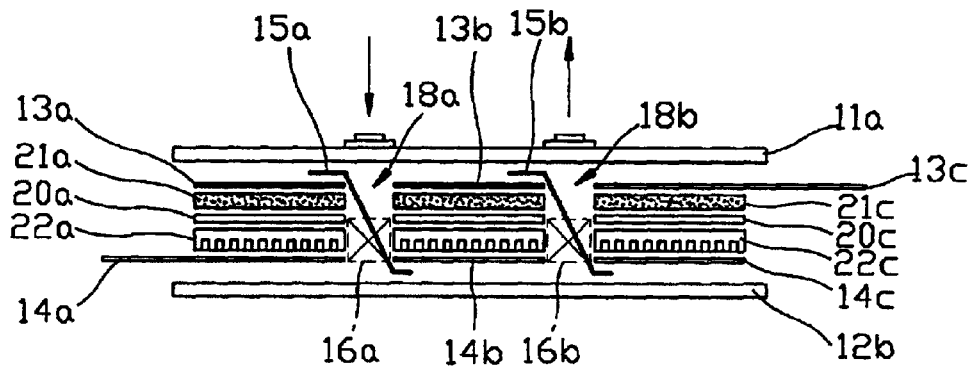
FIG. 10 is a lengthwise schematic sectional view illustrating the stack structure of the second embodiment of a cell pack according to the present invention.

FIG. 9 is a schematic perspective view illustrating the configuration of a fuel cell pack in which three cells are arranged in line according to the present invention. FIG. 10 is a sectional view of FIG. 9. In this second embodiment, the structure of each cell is the same as that of the first embodiment.

Referring to FIGS. 9 and 10, three cells are arranged in line at predetermined intervals between an anode end plate 11a and a cathode end plate 12a. Each cell includes a proton exchange membrane and electrodes assembly (a catalyzed membrane) 20a, 20b or 20c and a fuel diffusion member 21a, 21b or 21c in its middle and an air contact member 22a, 22b or 22c which are provided top and bottom surfaces of the proton exchange membrane 20a, 20b or 20c.

Hollows 18a and 18b are provided between the cells. Electrical connection members 15a and 15b are disposed within the respective hollows 18a and 18b. A fuel inlet 111a and a fuel outlet 112a corresponding to the hollows 18a and 18b, respectively, are disposed on the anode end plate 112a with a predetermined gap therebetween. As described in the first embodiment, each of the electrical connection members 15a and 15b is electrically connected to cells at both sides of each of the hollows 18a and 18b, so that the cells are connected in series. Here, one end of each electrical connection member 15a or 15b is connected to an anode collector plate 13a or 13b in one cell, and the other end is connected to a cathode collector plate 14b or 14c in the next cell. Fuel flow stoppers 16a and 16b are disposed in the lower portions of the respective hollows 18a and 18b to prevent fuel flowing in the upper portion of the respective hollows 18a and 18b from flowing toward cathodes.

In a fuel cell pack according to the second embodiment, three cells are arranged in line, and each of the collector plates 13a, 13b, 13c, 14a, 14b and 14c acts as a monopolar electrode as in the first embodiment. Accordingly, a fuel flow structure is provided within the cell pack so that fuel can be supplied to the three cells in a cycle through the fuel inlet 111a and the fuel outlet 112a provided on the anode end plate 11a. By applying such a structure, a cell pack of a structure in which three or more cells are arrange in line can be obtained.

In the second embodiment, members such as an anode, a cathode, a proton exchange membrane, a cathode collector plate and a cathode end plate may substantially have the same structures as those of the corresponding members in the first embodiment.

<<Third Embodiment>>

Figure 11:
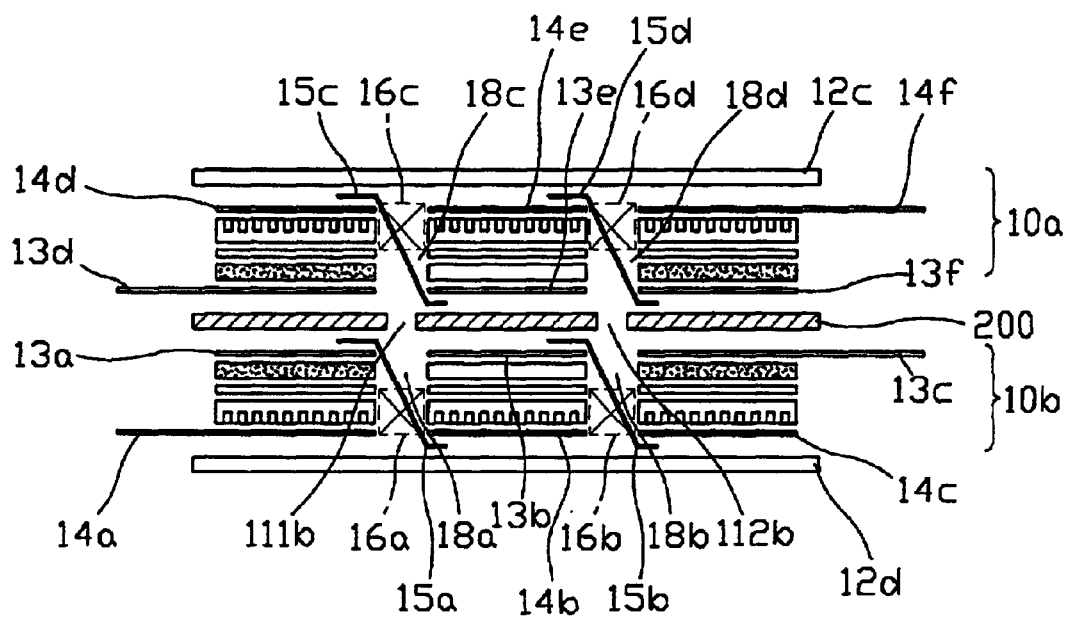
FIG. 11 is a lengthwise schematic sectional view illustrating the stack structure of a third embodiment of a cell pack according to the present invention.

In a fuel cell pack according to this embodiment, the structures according to the second embodiment are symmetrically disposed around an intermediate layer, and fuel is supplied starting from the intermediate layer toward anodes adjacent to the intermediate layer. FIG. 11 is a sectional view illustrating a cell pack of a double layer structure in which the cell packs having a structure described in the second embodiment are symmetrically stacked around an intermediate layer.

Referring to FIG. 11, unit cell packs 10a and 10b each having a structure described in the second embodiment are disposed on and beneath an intermediate layer 200. In other words, the unit cell packs 10a and 10b share the intermediate layer 200 as an anode end plate and have cathode end plates 12c and 12d, respectively.

In FIG. 11, each of the unit cell packs 10a and 10b disposed on and beneath the intermediate layer 200 includes three cells which are arranged in line with hollows 18a and 18b or 18c and 18d therebetween. Electrical connection members 15a, 15b, 15c and 15d are disposed in the hollows 18a, 18b, 18c and 18d, respectively. Each of the electrical connection members 15a, 15b, 15c and 15d is connected to an anode collector plate 13a, 13b, 13e or 13f of one cell and to a cathode collector plate 14b, 14c, 14d or 14f in an adjacent cell. Fuel flow stoppers 16a, 16b, 16c and 16d are disposed at portions near cathodes in the respective hollows 18a, 18b, 18c and 18d to prevent fuel supplied toward the anodes of the cells from flowing toward the cathodes.

Figure 12:
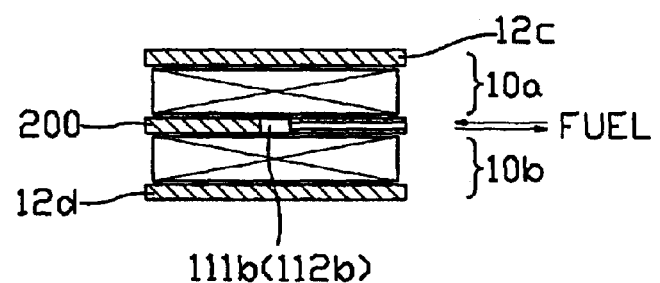
FIG. 12 is a widthwise schematic sectional view illustrating the fuel supply structure of the third embodiment of a cell pack according to the present invention.

In such a structure described above, fuel is supplied to the cells through the intermediate layer 200. An inlet 111b through which fuel is supplied to an anode of each cell and an outlet 112b are disposed in the intermediate layer 200. Referring to FIG. 12, the inlet 111b and the outlet 112b communicate with the upper and lower unit cell packs 10a and 10b, and a passage for the inflow/outflow of fuel from/to the outside is provided at one side of the intermediate layer 200.

Methods of manufacturing members commonly used in the first through third embodiments will be described below.

<<Methods of Manufacturing Members Constructing a Cell>>

Catalyzed Membrane

Pt/C powder containing a 20% Pt catalyst, an IPA solution and a 5% nafion solution were mixed, thereby producing catalyst ink. The catalyst ink was subjected to ultrasonic processing for uniform dispersion. A nafion 112 membrane was pre-treated with $H_2SO_4$ and $H_2O_2$ and then rinsed with deionized (DI) water. Both surfaces of the membrane were directly coated with the prepared catalyst ink using a spay gun. The membrane was cut such that an active area can be $2\times3$ $cm^2$.

Fuel Diffusion Member

Carbon paper (Toray 090) was cut such that the carbon paper has a predetermined size. The carbon paper was dipped in a slurry made by mixing graphite (Timrex KS6) power with polytetrafluoroethylene (PTFE) in a ratio of one to one and mixing the mixture with water, thereby manufacturing a flow field substrate (fuel diffusion member). The flow field substrate was dried. Ink in which carbon powder (Vulcan XCR), PTFE, an IPA solution and water were mixed was sprayed on the surface of the flow field substrate, thereby forming a diffusion layer. Then, for drying the flow field substrate and firing the PTFE, the resultant structure was thermally treated at a temperature of 350° C. Thereafter, the resultant structure was cut such that cut structure is 2 mm larger than a proton exchange membrane at both sides to facilitate sealing.

The fuel diffusion member is processed with teflon to have a hydrophobic property. The porosity and the size of a pore of the fuel diffusion member are adjusted by controlling the amount of carbon powder depending on the amount of supplied gas or liquid. For this, a technique disclosed in U.S. Pat. No. 5,998,057 can be used. The hydrophobic property is given to the fuel diffusion member by performing teflon processing so that the amount of moisture and the flow rate of fuel in the fuel diffusion member can be adjusted during the operation of a fuel cell, thereby reducing internal resistance and increasing reaction efficiency.

Air Contact Member

Air channels which were 1 mm in depth and width were formed on one surface of carbon paper (Toray 1.5t) having a thickness of 1.5 mm so that an area contacting the air could be maximized. Then, the carbon paper having the air channels was cut such that the size of a resultant air contact member is the same as the fuel diffusion member.

Other Members

A collector of each cell and an electrical connection member for connecting cells were formed to be meshes using gold, silver, copper or nickel foil. The collector is formed of metal such as gold or silver which has excellent corrosion-resistance and electric conductivity. The thickness of the collector is preferably 100 μm or less.

An anode end plate and a cathode end plate were manufactured in the form as described before and coupled using coupling parts such as bolts and nuts so that a certain pressure could be given to the remaining cell members between the anode and cathode end plates.

Figure 13:
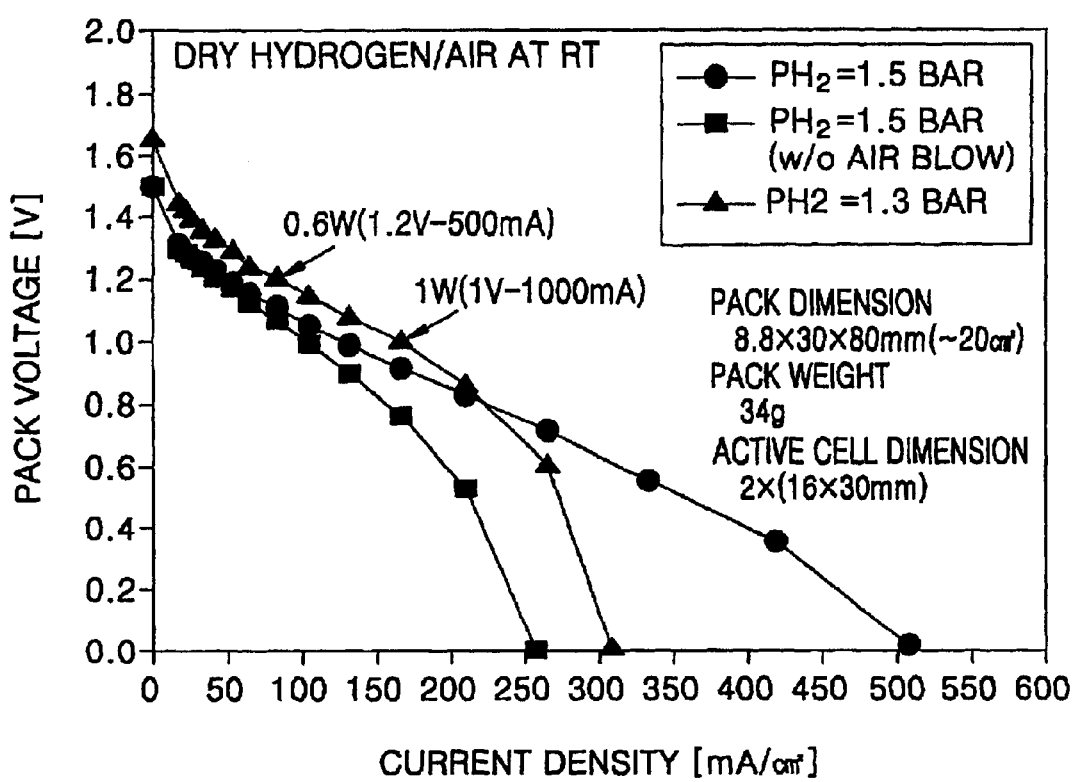
FIG. 13 is a line graph illustrating the power characteristics of a cell pack according to the present invention.

The power characteristics of a cell pack were estimated in a state in which the air was forcibly blown toward a cathode in a fuel cell pack according to the first embodiment of the present invention and in a state in which the air was allowed to flow due to natural convection in the fuel cell pack. Dry hydrogen was injected at a pressure of 1.5 bar while 1 stoichiometry is maintained. As a result, maximum power of 1 W was obtained. Here, the voltage and the current of the cell pack were 1 V and 1000 mA. FIG. 13 is a current density-pack voltage comparison line graph obtained from estimation performed at a room temperature (RT). The line graph of FIG. 13 is a result obtained under different three conditions of forcible blow ($PH_2$=1.5 bar), natural convection ($PH_2$=1.5 bar) and forcible blow of an atmospheric pressure ($PH_2$=1.3 bar). As seen from FIG. 13, power of 0.6 W was obtained even in the natural convection without forcible air circulation, and the temperature of the cell pack was maintained at 50° C. or lower without a separate cooling device.

According to the present invention, circulation of fuel for a plurality of cells is performed through a single inlet and a single outlet so that a fuel supply line is very simple compared to a structure of a fuel supply line for each cell in a conventional cell pack having a structural limitation. Particularly, a collector can be used as a monopolar electrode, fuel can be uniformly supplied throughout a cell, and a fuel supply and discharge structure is shared by a plurality of cells, so that the size and the weight of a cell pack can be reduced compared to a conventional cell pack. In addition, oxidation and reduction of fuel in a structure where the fuel is diffused on an anode and reduced on a cathode is improved so that a high current density can be obtained from a cell of a restricted size. Particularly, in the present invention, spontaneous cooling can be accomplished due to the structural characteristics of a cell pack without depending on a separate cooling device.

Although the invention has been described with reference to particular embodiments, it will be apparent to one of ordinary skill in the art that modifications to the described embodiment may be made. Therefore, the spirit and scope of the invention will be defined by the attached claims.

What is claimed is:

1. A fuel cell pack including a plurality of cells each having a membrane, and a cathode at one side of the membrane and an anode at another side of the membrane, collector plates contacting the cathode and the anode, respectively, in each cell, and an electrical connection member for electrically connecting adjacent cells, at least two cells being provided, the cells being evenly disposed in a plane with an enclosed, contiguous hollow space interposed between two adjacent cells, the electrical connection member being positioned in the enclosed, contiguous hollow space, the fuel cell pack comprising:

a porous fuel diffusion member contacting the anode of each cell;

a porous air contact member contacting the cathode of each cell;

an anode end plate and a cathode end plate disposed at the side of the anodes of the cells and at the side of the cathodes of the cells, respectively;

fuel supply and discharge means for supplying fuel toward the anodes in the enclosed, contiguous hollow space and discharging the fuel;

a fuel flow stopper disposed at a portion at the part of the cathodes in the enclosed, contiguous hollow space, the fuel flow stopper preventing fuel flowing at a portion at the part of the anodes in the hollow space from flowing toward the portion at the part of the cathodes in the enclosed, contiguous hollow space; and a sealing member for sealing the anodes of the cells in said enclosed hollow, contiguous space and the portion of the hollow space corresponding to the anodes.

2. A fuel cell pack including a plurality of cells each having a membrane, and a cathode at one side of the membrane and an anode at another side of the membrane, collector plates contacting the cathode and the anode, respectively, in each cell, and an electrical connection member for electrically connecting adjacent cells, at least two cells being provided, the cells being evenly disposed in a plane with a space interposed between two adjacent cells, the electrical connection member being positioned in the space, the fuel cell pack comprising:

a porous fuel diffusion member contacting the anode of each cell;

a porous air contact member contacting the cathode of each cell;

an anode end plate and a cathode end plate disposed at the side of the anodes of the cells and at the side of the cathodes of the cells, respectively;

fuel supply and discharge means for supplying fuel toward the anodes in the space and discharging the fuel;

a fuel flow stopper disposed at a portion at the part of the cathodes in the space, the fuel flow stopper preventing fuel flowing at a portion at the part of the anodes in the space from flowing toward the portion at the part of the cathodes in the space; and a sealing member for sealing the anodes of the cells in said space and the portion of the space corresponding to the anodes, wherein a fuel inlet and a fuel outlet corresponding to the space are disposed on the anode end plate.

3. The fuel cell pack of claim 1, wherein the porous fuel diffusion member is formed of a carbon-plastic composite.

4. The fuel cell pack of claim 3, wherein the porous fuel diffusion member comprises carbon or graphite impregnated therein.

5. The fuel cell pack of claim 1, wherein the porous air contact member is formed of a carbon-plastic composite.

6. The fuel cell pack of claim 1, wherein the porous air contact member has a plurality of channels for the flow of air on the bottom thereof.

7. A fuel cell pack including a plurality of cells each having a membrane, and a cathode at one side of the membrane and an anode at another side of the membrane, collector plates contacting the cathode and the anode, respectively, in each cell, and an electrical connection member for electrically connecting adjacent cells, at least two cells being provided, the cells being evenly disposed in a plane with a space interposed between two adjacent cells, the electrical connection member being positioned in the space, the fuel cell pack comprising:

a porous fuel diffusion member contacting the anode of each cell;

a porous air contact member contacting the cathode of each cell;

an anode end plate and a cathode end plate disposed at the side of the anodes of the cells and at the side of the cathodes of the cells, respectively;

fuel supply and discharge means for supplying fuel toward the anodes in the space and discharging the fuel;

a fuel flow stopper disposed at a portion at the part of the cathodes in the space, the fuel flow stopper preventing fuel flowing at a portion at the part of the anodes in the space from flowing toward the portion at the part of the cathodes in the space; and a sealing member for sealing the anodes of the cells in said space and the portion of the space corresponding to the anodes, wherein the electrical connection member has a shape of a mesh.

8. A fuel cell pack including a plurality of cells each having a membrane, and a cathode at one side of the membrane and an anode at another side of the membrane, collector plates contacting the cathode and the anode, respectively, in each cell, and an electrical connection member for electrically connecting adjacent cells, at least two cells being provided, the cells being evenly disposed in a plane with a space interposed between two adjacent cells, the electrical connection member being positioned in the space, the fuel cell pack comprising:
- a porous fuel diffusion member contacting the anode of each cell;
- a porous air contact member contacting the cathode of each cell;
- an anode end plate and a cathode end plate disposed at the side of the anodes of the cells and at the side of the cathodes of the cells, respectively;
- fuel supply and discharge means for supplying fuel toward the anodes in the space and discharging the fuel;
- a fuel flow stopper disposed at a portion at the part of the cathodes in the space, the fuel flow stopper preventing fuel flowing at a portion at the part of the anodes in the space from flowing toward the portion at the part of the cathodes in the space; and
- a sealing member for sealing the anodes of the cells in said space and the portion of the space corresponding to the anodes, wherein through holes are formed in the collector plates contacting the cathodes and the cathode end plate such that the through holes in the collector plates correspond to those in the cathode end plate one to one.

9. A fuel cell pack including a plurality of cells each having a membrane, a cathode at one side of the membrane and an anode at another side of the membrane, collector plates contacting the cathode and the anode, respectively, in each cell, and an electrical connection member for electrically connecting adjacent cells, at least two cells being provided, the cells being disposed on opposite sides of an intermediate layer, which is provided with fuel supply and discharge means, with an enclosed, contiguous hollow space of given volume interposed between two adjacent cells in the level direction of the intermediate layer, the electrical connection member being disposed in the enclosed, continuous hollow space, the anodes of the cells disposed on both sides of the intermediate layer contacting the intermediate layer, the fuel cell pack comprising:
- a porous fuel diffusion member contacting the anode of each cell;
- a porous air contact member contacting the cathode of each cell;
- first and second end plates disposed at the respective sides of the cathodes of the cells;
- a fuel flow stopper disposed at a portion corresponding to the cathodes of adjacent cells in the enclosed, contiguous hollow space, the fuel flow stopper preventing fuel flowing at a portion at the part of the anodes in the enclosed, contiguous hollow space from flowing toward the portion at the part of the cathodes in the enclosed, contiguous hollow space; and
- a sealing member for sealing the anodes of the cells and the portion of an enclosed, contiguous hollow space corresponding to the anodes.

10. The fuel cell pack of claim 9, wherein fuel is supplied to the anodes starting from anodes at the center of the fuel cell pack.

11. The fuel cell pack of claim 9, wherein at least two cells are disposed on each of both sides of the intermediate layer, and a fuel inlet and a fuel outlet which correspond to hollow spaces, respectively, between the cells are disposed in the intermediate layer at a predetermined interval.

12. The fuel cell pack of claim 9, wherein the porous fuel diffusion member is formed of a carbon-plastic composite.

13. The fuel cell pack of claim 9, wherein the porous fuel diffusion member comprises carbon or graphite impregnated therein.

14. The fuel cell pack of claim 9, wherein the porous air contact member is formed of a carbon-plastic composite.

15. The fuel cell pack of claim 9, wherein the air contact member has a plurality of channels for the flow of air on the bottom thereof.

16. A fuel cell pack including a plurality of cells each having a membrane, a cathode at one side of the membrane and an anode at another side of the membrane, collector plates contacting the cathode and the anode, respectively, in each cell, and an electrical connection member for electrically connecting adjacent cells, at least two cells being provided, the cells being disposed on opposite sides of an intermediate layer, which is provided with fuel supply and discharge means, with a space of given volume interposed between two adjacent cells in the level direction of the intermediate layer, the electrical connection member being disposed in the space, the anodes of the cells disposed on both sides of the intermediate layer contacting the intermediate layer, the fuel cell pack comprising:
- a porous fuel diffusion member contacting the anode of each cell;
- a porous air contact member contacting the cathode of each cell;
- first and second end plates disposed at the respective sides of the cathodes of the cells;
- a fuel flow stopper disposed at a portion corresponding to the cathodes of adjacent cells in the space, the fuel flow stopper preventing fuel flowing at a portion at the part of the anodes in the space from flowing toward the portion at the part of the cathodes in the space; and
- a sealing member for sealing the anodes of the cells and the portion of a space corresponding to the anodes, wherein the electrical connection member has a shape of a mesh.

17. A fuel cell pack comprising:
a plurality of cells in a plane, each of said plurality of cells including
- a membrane;
- a cathode at one side of the membrane;
- a porous air contact member contacting the cathode;
- an anode at an opposite side of the membrane;
- a porous fuel diffusion member contacting said anode;
- collector plates respectively contacting said cathode and the anode in each cell; and
- an electrical connection member for electrically connecting adjacent cells within said cell pack,
wherein a an enclosed, contiguous hollow space is interposed between two adjacent cells in said cell pack and said electrical connection member being positioned in the enclosed, contiguous hollow space;
said cell pack further comprising:
- fuel supply and discharge means for supplying fuel toward the anodes in the enclosed, contiguous hollow space and discharging the fuel;
- a fuel flow stopper disposed in said enclosed, contiguous hollow space between and in a plane common with said cathodes, the fuel flow stopper preventing fuel supplied to adjacent anodes in said cell pack and in said enclosed, contiguous hollow space from flowing onto cathodes of adjacent fuel cells; and a sealing member sealing a space containing the anodes of said adjacent cells.

18. A fuel cell pack comprising:

a plurality of cells in a plane, each of said plurality of cells including
- a cathode at one side of the membrane;
- a porous air contact member contacting the cathode;
- an anode at an opposite side of the membrane;
- a porous fuel diffusion member contacting said anode;
- collector plates respectively contacting said cathode and the anode in each cell; and
- an electrical connection member for electrically connecting adjacent cells within said cell pack,
- wherein a space is interposed between two adjacent cells in said cell pack and said electrical connection member being positioned in the space;

said cell pack further comprising:
- fuel supply and discharge means for supplying fuel toward the anodes in the space and discharging the fuel;
- a fuel flow stopper disposed in said space between and in a plane common with said cathodes, the fuel flow stopper preventing fuel supplied to adjacent anodes in said cell pack and in said space from flowing onto cathodes of adjacent fuel cells; and
- a sealing member sealing a space containing the anodes of said adjacent cells, wherein a fuel inlet and a fuel outlet corresponding to the hollow space are disposed on an anode end plate disposed at the side of said adjacent anodes.

19. A fuel cell pack comprising:

a plurality of cells in a plane, each of said plurality of cells including
- a membrane;
- a cathode at one side of the membrane;
- a porous air contact member contacting the cathode;
- an anode at an opposite side of the membrane;
- a porous fuel diffusion member contacting said anode;
- collector plates respectively contacting said cathode and the anode in each cell; and
- an electrical connection member for electrically connecting adjacent cells within said cell pack,
- wherein a space is interposed between two adjacent cells in said cell pack and said electrical connection member being positioned in the space;

said cell pack further comprising:
- fuel supply and discharge means for supplying fuel toward the anodes in the space and discharging the fuel;
- a fuel flow stopper disposed in said space between and in a plane common with said cathodes, the fuel flow stopper preventing fuel supplied to adjacent anodes in said cell pack and in said space from flowing onto cathodes of adjacent fuel cells; and
- a sealing member sealing a space containing the anodes of said adjacent cells, wherein the electrical connection member is in a mesh.

20. A fuel cell pack comprising:

a plurality of cells in a plane, each of said plurality of cells including
- a membrane;
- a cathode at one side of the membrane;
- a porous air contact member contacting the cathode;
- an anode at an opposite side of the membrane;
- a porous fuel diffusion member contacting said anode;
- collector plates respectively contacting said cathode and the anode in each cell; and
- an electrical connection member for electrically connecting adjacent cells within said cell pack,
- wherein a space is interposed between two adjacent cells in said cell pack and said electrical connection member being positioned in the space;

said cell pack further comprising:
- fuel supply and discharge means for supplying fuel toward the anodes in the space and discharging the fuel;
- a fuel flow stopper disposed in said space between and in a plane common with said cathodes, the fuel flow stopper preventing fuel supplied to adjacent anodes in said cell pack and in said space from flowing onto cathodes of adjacent fuel cells; and
- a sealing member sealing a space containing the anodes of said adjacent cells, wherein through holes are formed in the collector plate contacting the cathode in at least one of said plurality of fuel cells and a cathode end plate disposed at the side of said adjacent cathodes in said fuel cell pack such that the through holes in the collector plate corresponding to those in the cathode end plate in one-to-one correspondence.

* * * * *